F. SHILLIN.
CAR STAKE.
APPLICATION FILED MAY 13, 1908.
903,418.
Patented Nov. 10, 1908.
2 SHEETS—SHEET 1.
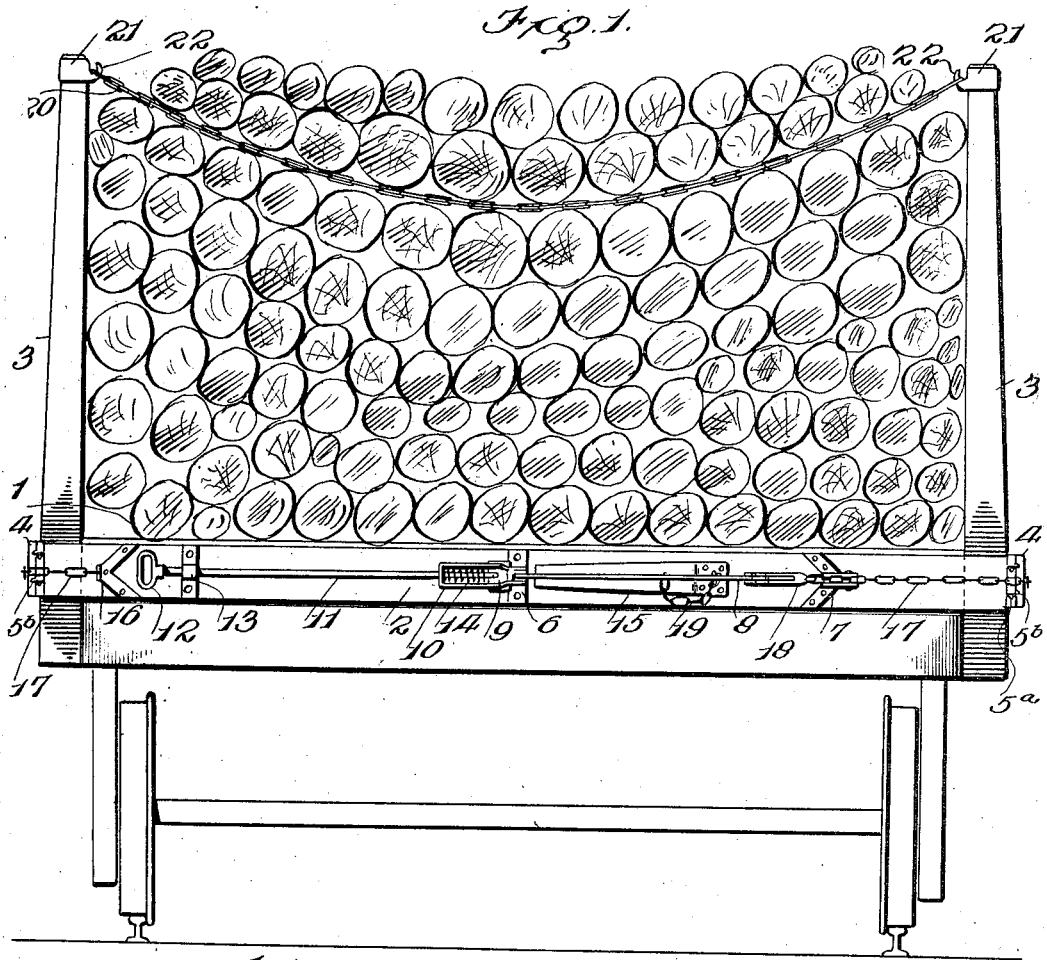
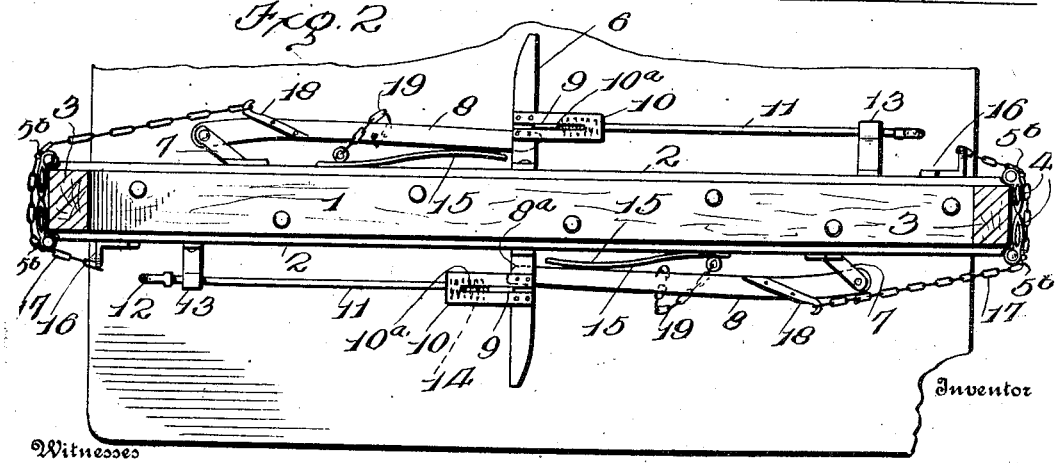

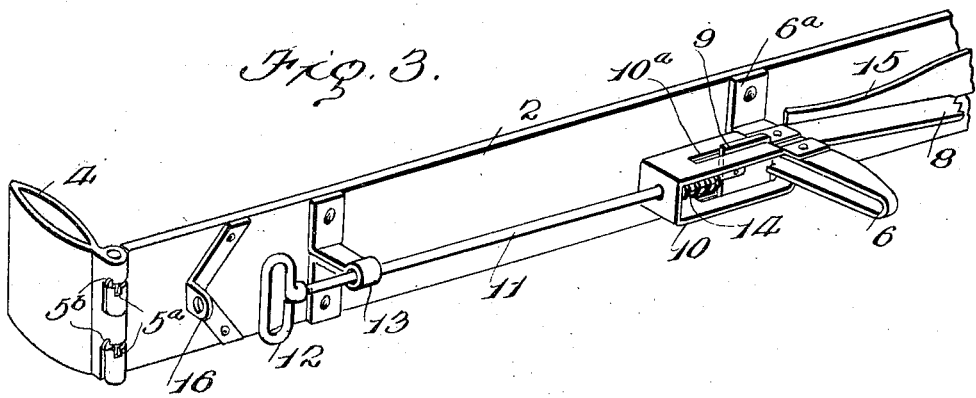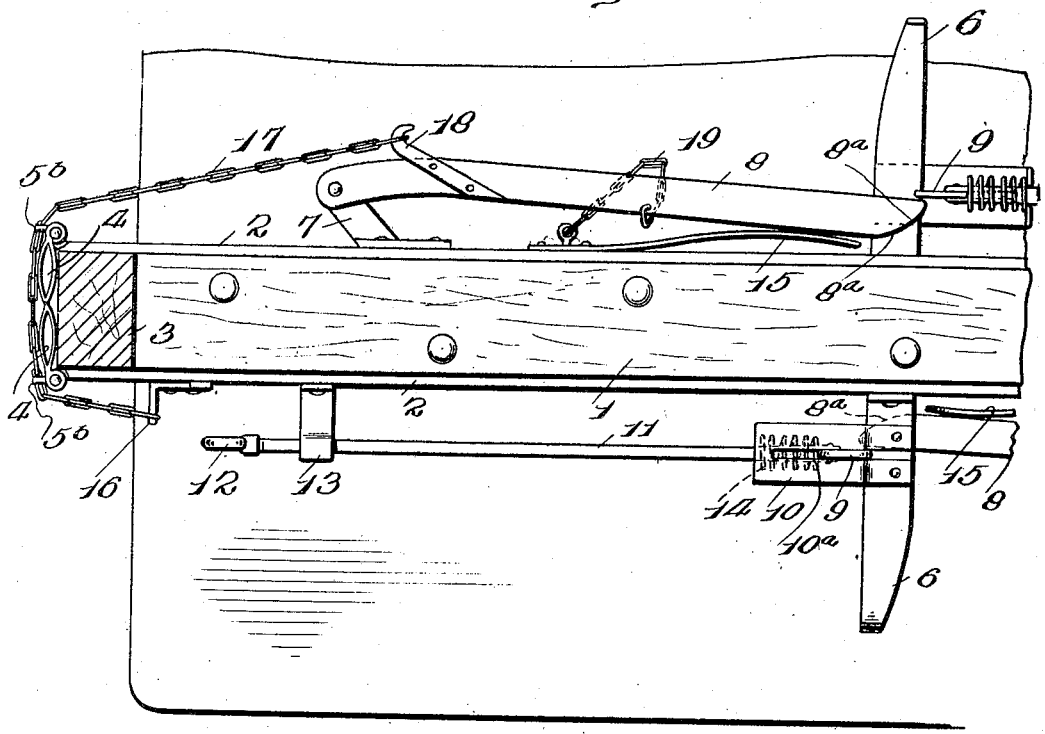

UNITED STATES PATENT OFFICE.

FRANK SHILLIN, OF SUNDBY, MINNESOTA.

CAR-STAKE.

No. 903,418.  Specification of Letters Patent.  Patented Nov. 10, 1908.

Application filed May 13, 1908. Serial No. 432,669.

*To all whom it may concern:*

Be it known that I, FRANK SHILLIN, citizen of the United States, residing at Sundby, in the county of St. Louis and State of Minnesota, have invented certain new and useful Improvements in Car-Stakes, of which the following is a specification.

The present invention relates to improvements in car stakes and has for its object to provide a device of this character embodying a novel construction whereby the stakes may be rigidly locked in position during the transportation of the load and quickly released when it is desired to remove the load from the car or vehicle.

A further object of the invention is to provide a durable and inexpensive stake which is efficient in operation and can be readily applied to a car, vehicle, sled, or the like device.

For a full understanding of the invention and the merits thereof and also to acquire a knowledge of the details of construction and the means for effecting the result, reference is to be had to the following description and accompanying drawings, in which:

Figure 1 is an end view of a car having the improved stake applied thereto. Fig. 2 is a top plan view of one of the transverse beams carrying the stakes. Fig. 3 is a detail view of one of the side plates applied to the transverse beams, portions being broken away. Fig. 4 is an enlarged top plan view of a portion of one of the stake carrying beams. Fig. 5 is an enlarged detail view of one of the hinged locking members.

Corresponding and like parts are referred to in the following description and indicated in all the views of the drawings by the same reference characters.

Referring to the drawing, the numeral 1 designates a beam which is secured to the upper face of the bed of a car or vehicle and extends transversely across the same, a plurality of those beams being employed and the exact number depending upon the nature of the load being transported. Applied to opposite sides of each of the beams 1 is a plate 2, the ends of the plates projecting beyond the extremities of the beam and being designed to receive the base of the stakes 3 which project upwardly from the beam at opposite ends thereof. Locking plates 4 are hinged to the extremities of the plates 2 and are designed either to be swung inwardly into contact with the stakes 3 so as to clamp the same against the extremities of the beam 1 or to be swung outwardly so as to release the stakes. In the preferred construction these locking plates 4 have an approximately elliptical cross section and are enlarged at their central portion so as to coöperate effectively with a binding chain to clamp the stakes rigidly in position as will be hereinafter more fully set forth. Attention is also directed to the fact that the swinging locking plates are so mounted that when swung outwardly to release the car stakes they are held in such position and can not be again swung inwardly until they have been lifted a slight amount. For this purpose it will be observed that one set of the sleeves of each hinge is notched at $5^a$ while the opposite set is provided with the tongues $5^b$ which are designed to enter the notches $5^a$ when the locking plate is swung outwardly, the plate thereby dropping a slight amount and being locked in an open or inoperative position.

Projecting outwardly from the central portion of each of the side plates 2 is a bracket 6, each of the brackets comprising a pair of spaced members and being shown as formed by doubling a strip of material upon itself, the ends of the strip being extended outwardly at $6^a$ and secured to the side plate. A pair of lugs 7 project from each of the side plates 2 toward one end thereof and pivotally mounted between each pair of these lugs is a locking lever 8 the free end of which is designed to be received between the spaced members of the bracket. A spring catch is provided for holding the locking lever in such position and in the present instance this catch is formed by a plate 9 which is slidably mounted in an arm 10 projecting from one side of the bracket 6. This arm 10 has a U-formation and the limbs thereof are slotted at $10^a$ to form a guide way for the plate 9. A releasing rod 11 which is connected to the plate 9 passes loosely through the end of the arm 10 and has a finger-piece 12 detachably applied to the extremity thereof, such a construction having the advantage of enabling the parts to be readily assembled in the manufacture of the device. If found desirable a keeper 13 may be secured to the plate 2 for receiving the releasing rod and directing the movements thereof. A coil spring 14 is interposed between the plate 9 and the end of the arm 10 projecting from the bracket and surrounds the locking rod, the said spring normally tending to move the plate into an operative position. The extremity of the locking lever 8 is beveled at 8ᵃ so that when the lever is swung rearwardly toward the side plate 2 the beveled end thereof will engage the plate 9 and force the same rearwardly against the action of the coil spring 14 until the end of the lever has been swung beyond the plate. The spring will then move the plate over the end of the lever so as to lock the same securely in position. However, by pulling upon the releasing rod 11 and withdrawing the plate 9 the locking lever will be released and forced outwardly by a spring strip 15 which is secured to the side plate 2.

Projecting from each of the side plates 2 is an eye 16 which engages the chain or cable 17, the said eyes being located at the end of the side plates opposite that upon which the locking levers are mounted. It will also be observed that the locking levers upon opposite sides of each of the beams 1 are arranged in a reverse manner and that each of the locking levers is provided with a hook 18 designed to engage the cable or chain 17 which is secured to the side plate upon the opposite side of the beam and extends around one end of the device for holding the swinging locking plates 4 in operative position. When these locking levers 8 are swung outwardly the cables or chains 17 are released and permit the locking plates 4 to be moved away from the stakes 3. In this connection it may be mentioned that the swinging movement of each of the locking levers is limited by means of a chain or tie member 19 having one end thereof connected to the lever while the opposite end is connected to the side plate 2. When it is desired to secure the stakes 3 in position the latter members are applied to the beam 1 and the swinging locking plates 4 lifted to disengage the tongues 5ᵇ from the notches 5ᵃ of the hinges and then swung inwardly against the stakes. The locking chains or cables 17 are next drawn around the swinging locking plates at opposite ends of the beam, and placed in engagement with the hooks 18 upon the locking levers 8, the said locking levers being swung rearwardly until engaged by the plates 9. This movement of the locking levers draws the cables or chains 17 tightly around the swinging locking plates 4 so that the latter members are caused to clamp the stakes rigidly against the extremities of the beam 1. Should it be desired to remove either of the car stakes the corresponding locking lever 8 is released by pulling upon the rod 11, the spring strip 15 then forcing the lever outwardly so that the locking cable or chain 17 becomes disengaged from the hook 18 and the swinging locking plates are permitted to swing outwardly. The stake 3 will then fall out of position of its own accord and permit the load upon the car to be deposited at one side thereof.

It may be here mentioned that where several of the above described devices are mounted upon the car and it is desired to release all of the stakes upon one side of the car at the same time, the various releasing rods 11 may be provided with cords upon which the operator can pull simultaneously.

In using the device for the transportation of logs the stakes upon one side of the car are first placed in position and as many logs as convenient then loaded upon the car. The stakes upon the opposite side of the car are next placed in position and the car filled to a point adjacent the top of the stakes. The upper ends of corresponding stakes upon opposite sides of the car are then connected by a tie member or chain 20, the stakes being shown in the present instance as provided with caps 21 carrying clevises 22 for engagement with the tie member. Additional logs are placed upon the car above the tie members 20 and coöperate with these tie members to form binders for preventing any spreading of the stakes. For unloading the car the stakes upon one side thereof are released as previously described, the pressure of the logs against the stakes forcing the latter members out of position and causing a portion of the logs to be deposited upon the ground at one side of the car. The stakes which have been released may then be either detached from the tie members 20 or thrown upon the opposite side of the car as found most convenient and the remainder of the logs removed from the car.

Having thus described the invention, what is claimed as new is:

1. In a device of the character described, the combination of a beam, a stake, a swinging locking plate carried by the beam and having a substantially elliptical formation so as to be provided with a pair of convex faces one of which is adapted to engage the stake, and a cable engaging the opposite convex face of the locking plate and coöperating with the same to clamp the car stake in position.

2. In a device of the character described, the combination of a beam, a pair of plates applied to opposite sides of the beam and projecting beyond the end thereof, a stake fitting against the end of the beam between the plates, a pair of swinging locking plates mounted upon the side plates and adapted to engage the stake, and a cable for coöperation with the two locking plates for clamping the stake in position.

3. In a device of the character described, the combination of a beam, a stake, a swinging locking plate carried by the beam, a lever mounted upon the beam and provided with a hook, and a cable connected to the beam and detachably engaging the hook upon the lever, the cable and lever coöperating with the swinging locking plate to clamp the stake in position.

4. In a device of the character described, the combination of a beam, plates applied to opposite sides of the beam, stakes, swinging locking plates mounted upon the said plates, locking levers mounted upon the plates, and cables coöperating with the locking levers and clamping plates to hold the stakes in position.

5. In a device of the character described, the combination of a beam, plates applied to opposite sides of the beam, stakes adapted to be clamped against the ends of the beam, swinging locking plates mounted upon the said plates, a locking lever mounted upon each of the plates, a pair of cables each of which is connected to one of the plates and designed to detachably engage the locking lever upon the opposite plate, the said cables coöperating with the levers and locking plates to clamp the stakes in position, and means upon each of the plates for engaging the corresponding locking lever to hold the same in an operative position.

6. In a device of the character described, the combination of a beam, plates applied to opposite sides of the beam, stakes adapted to be clamped against the ends of the beam, swinging locking plates mounted upon the said plates, a locking lever mounted upon each of the plates, a pair of cables each of which is connected to one of the plates and is designed to detachably engage the lever upon the opposite plate, a bracket projecting from each of the plates, a catch upon each of the brackets for engaging the corresponding locking lever to hold the same in operative position, and means for releasing the catch.

7. In a device of the character described, the combination of a beam, plates applied to opposite sides of the beam, stakes adapted to be clamped against the ends of the beam, swinging locking plates mounted upon the said plates, a locking lever mounted upon each of the plates, a pair of cables each of which is connected to one of the plates and is designed to detachably engage the lever upon the opposite plate, a bracket projecting from each of the plates, a catch upon each of the brackets for engaging the corresponding locking lever to hold the same in operative position, and a releasing rod applied to the catch for drawing the same into an inoperative position.

8. In a device of the character described, the combination of a beam, stakes, means for clamping the stakes against the ends of the beam, levers mounted upon the beam and having an operative connection with the clamping means, brackets projecting from the beam and loosely receiving the levers, slides mounted upon the brackets for engaging the levers to hold the same in an operative position, and means for moving the slides to release the lever.

In testimony whereof I affix my signature in presence of two witnesses.

FRANK SHILLIN. [L. S.]

Witnesses:
N. H. WILSON,
JOHN H. BRIGHAM.